Jan. 22, 1929.　　　　　　　　　　　　　　　　　　1,700,109
M. E. ROE
SCOOTER BRAKING MECHANISM
Filed Dec. 17, 1924　　　　2 Sheets-Sheet 1
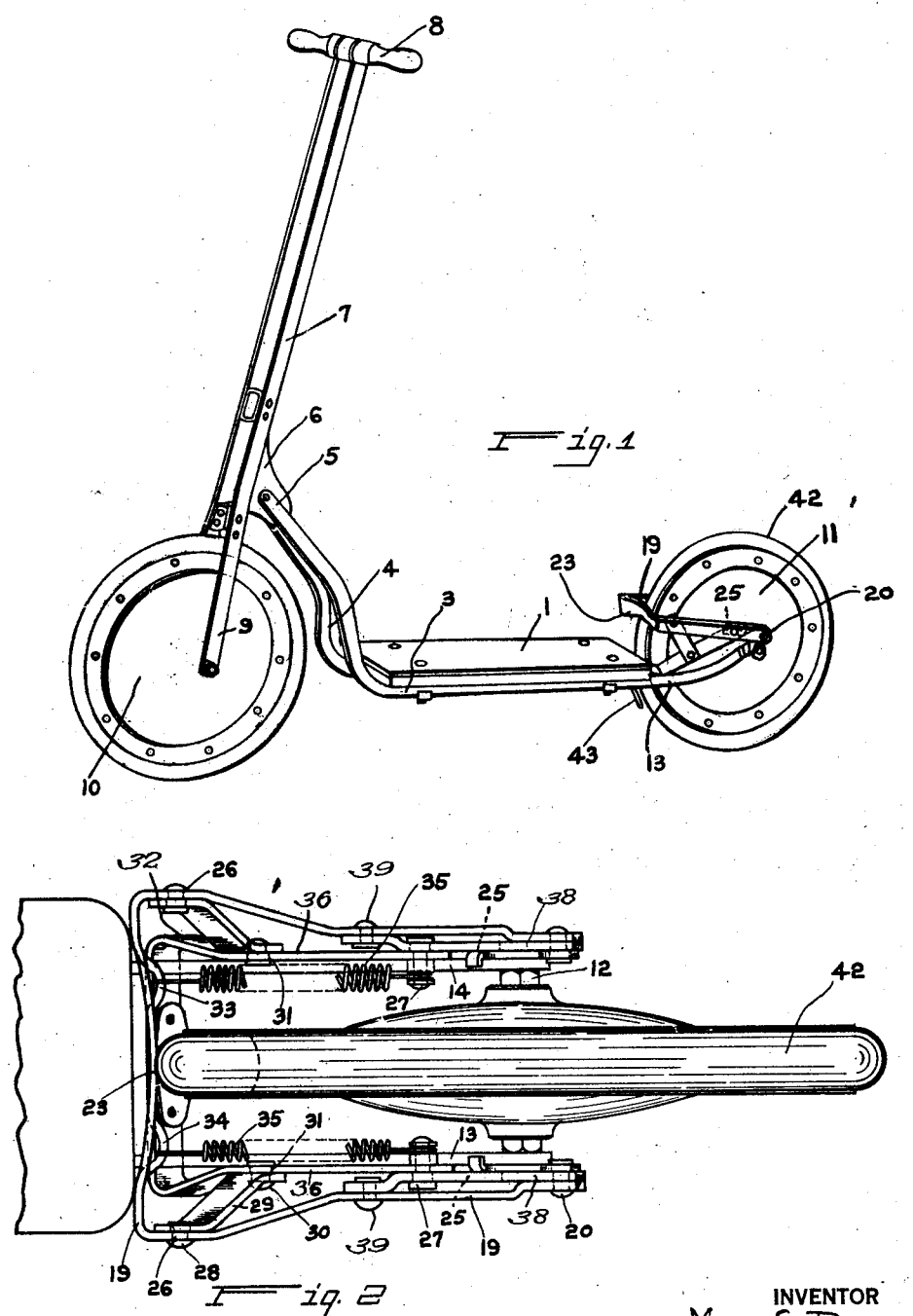
INVENTOR
Mayo E. Roe
BY
Richey Slough & Watts
ATTORNEYS

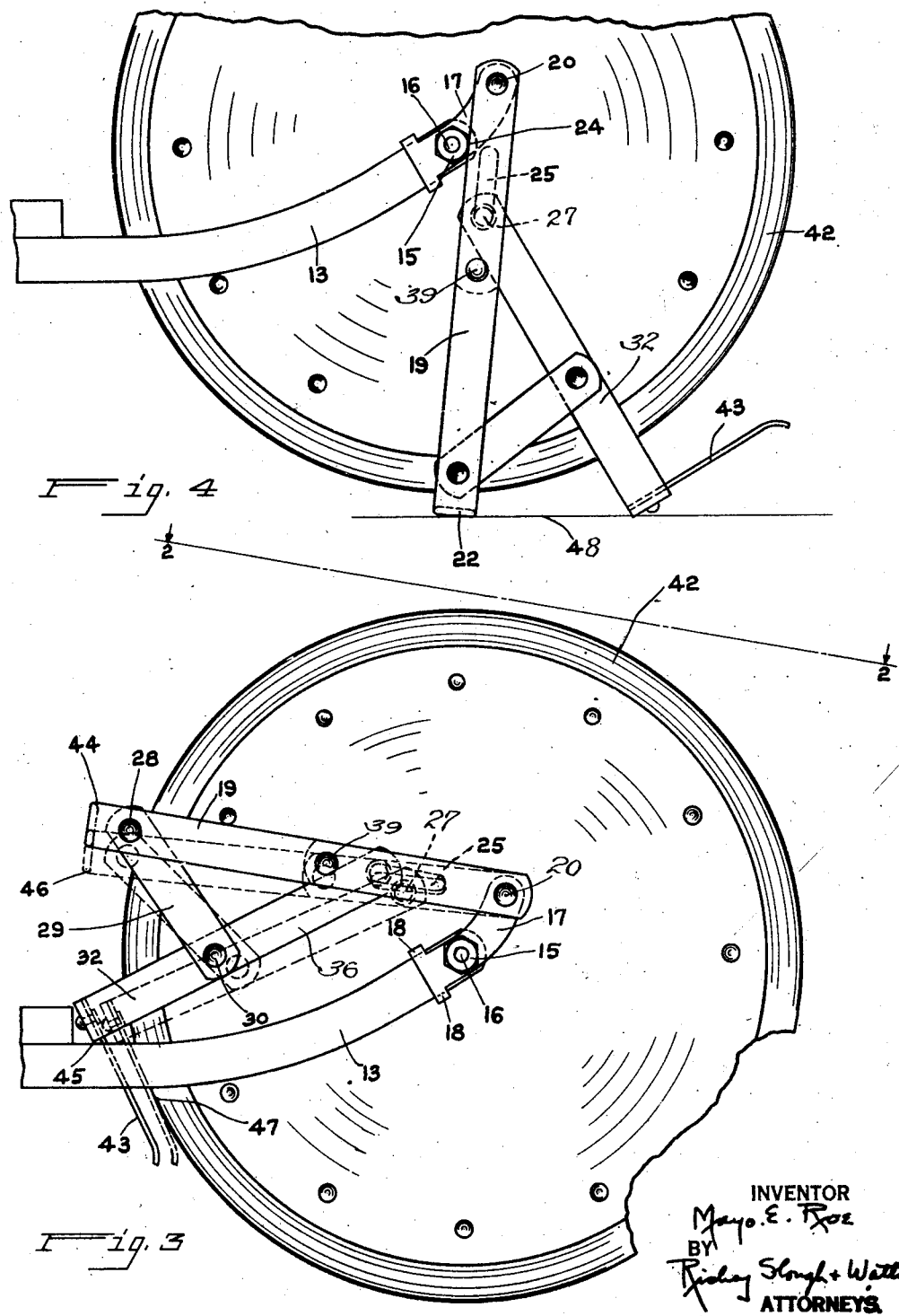

Patented Jan. 22, 1929.

1,700,109

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

SCOOTER BRAKING MECHANISM.

Application filed December 17, 1924. Serial No. 756,419.

My invention relates to scooter braking mechanisms and relates more particularly to a braking mechanism for that type of vehicles now commonly known as "scooters" and involves certain features of improvement over that shown in my co-pending application, Serial No. 756,503, filed coincidently herewith, the mechanisms in both cases being adapted to serve both as a brake for the vehicle and a portion thereof as a stand therefor.

An object of my invention is to provide a brake mechanism for a scooter which can be readily operated by the foot of the rider.

Another object of my invention is to provide a brake mechanism for a scooter which will be highly efficient in operation, durable in use and at the same time so designed that the manufacturing cost of the same will be relatively low.

Another object of my invention is to provide a brake mechanism of the type described and in which the function of a stand for the vehicle may be performed by a portion of the apparatus which controls the operation of the braking mechanism.

Another object of my invention is to provide an improved combined brake and stand for two-wheeled vehicles which will have two operative positions and a normal inoperative position, one of the operative positions being that in which the mechanism is used as a stand to support the wheeled vehicle when not in use.

Other objects of my invention and the invention itself will become apparent as the description of an embodiment thereof progresses and in which description reference will be had to the drawings accompanying this specification and forming a part thereof.

Referring to the drawing—

Fig. 1 shows a perspective side elevation of a scooter comprising an embodiment of my invention;

Fig. 2 shows a plan view of the said embodiment, a fragment of the scooter of Fig. 1 being shown in connection therewith.

Fig. 3 shows a side elevation of the apparatus of Fig. 2;

Fig. 4 shows a side elevation similar to that of Fig. 3 but with the braking mechanism moved to vehicle supporting position.

Referring now to all of the figures in all of which like parts are designated by like reference characters, at 1 I show a foot board for a two-wheeled vehicle of a well known type carried on frame members 3 and 4 which are joined at 5 to a steering knuckle 6 rotatably secured in a steering column 7 having handles 8 and terminating at its lower end in a fork 9. The fork 9 carries at its lower end a rotatable front wheel 10 which is dirigible by means of the handles 8.

The frame members 3 and 4 extend rearwardly to a rear wheel 11 carried between the ends of the two frame members 3 and 4, the wheel 11 being freely rotatable on an axle 12 secured in the ends 13 and 14 of the frame side members 3 and 4.

As is well known, such a scooter vehicle as so far described is used as a coaster and is propelled at times by the rider resting one foot on the foot board 1 and holding the steering handles 8 and thrusting the other foot rearwardly on the ground to shove the vehicle ahead, the weight of the rider's body being carried on the foot board, and at intervals, when coasting, the rider may rest his entire weight on the foot board.

It is well known that children, who commonly use such vehicles, may desire to use them for coasting down severe grades and into streets where they are endangered by passing traffic, and it is an object of my invention therefore to permit the immediate stopping of the scooter vehicle by the operator through the provision of a highly efficient braking mechanism which may be simply and easily operated to retard the rotation of the rear wheel 11 by bringing into frictional engagement with the tire 42 thereof a brake shoe 43. This is accomplished through the medium of a lever linkage comprising a pedal portion and a retractile spring for restoring purposes as will now be described.

At 15, on either side of the wheel 11, I provide securing nuts for the end of the axle 12 and which clamp to the stationary portion of such axle, the side frame members 3 and 4 at their ends 13 and 14 which are perforated and passed over the ends of the stationary axle shaft shown at 16.

At 17, I provide a supporting bracket perforated to admit the end of the axle shaft 16, and having bent over ears or lugs 18 resting against the top and bottom edges of the side frame members. Two complementary brackets 17 are provided, one for each side of the vehicle and in like manner are clamped by the nuts 15 together with the side frame members to the stationary axle 12, the lugs 18 rigidly support the brackets 17 non-rotatably on the rear end of the frame side members and with the ends of the brackets 17 presented upwardly and rearwardly from the axle ends 16.

At 19 I show a substantially U-shaped lever element pivotally secured by bolts 20 to the ends of the brackets 17, the bolts 20 passing through a hinge perforation in the ends of the brackets and the U-shaped member, and the opening through the lever member ends being preferably larger somewhat than the diameter of the shanks of the bolts or rivets 20 passing through such perforations.

The lever member 19 passes around the vehicle wheel from one end of the axle, being looped over the periphery of the wheel tire 42 thereof and back to the other end of the wheel axle and is rotatable on the hinge comprising the bolts 20 so as to take the position as shown in Figs. 1 and 3 which is the normal inoperative position, or to take the position indicated by the dotted lines in Fig. 3 which is its braking position, such braking position being had when the operator depresses the lever 19 by pressing his foot against the top edge shown at 44 thereof. The lever member 19 is also adapted to be rotated about the hinge bolts 20 to a nearly vertical position as shown in Fig. 4 wherein the end or intermediate portion thereof shown at 22 will rest upon the ground indicated by line 48 and support the tire 42 out of contact with the ground, the vehicle thereby resting upon the laterally disposed portions of the intermediate portion 22 of the lever and the front wheel 10. The mid-portion of the lever 19 is bent concavely as shown at 23 so that when the intermediate portion 22 rests upon the ground, it will do so near its ends securing a substantially three-point contact between the ground and the vehicle. At such time the lever 19, although approximately vertical, is slightly inclined therefrom, the bottom portion comprising the intermediate arm 22 being disposed forwardly of a vertical line projected from the hinge bolts 20 so that the weight of the vehicle will cause the lever 19 at the point 24 to engage the sides of the nuts 15 which prevents further rotative movement of the end of the lever 19 forwardly, and forms a stop for the lever.

At 38 I provide a pair of auxiliary members each of which is rigidly secured in parallel relation to the rear end portion of a different one of the lever arms 19, being secured thereto by rivets 39 and 20 at its two ends. Pivot pins 27 are secured each to a different one of the lever arms 36 of lever 32. I likewise perforate the side arms of the U-shaped lever 19, the slot 25 and the perforation 26 being for the purpose of admitting the shanks of pivot pins or rivets 27 and 28 respectively, these being headed over at either end, the pins 27 being slidably reciprocable in slots 25 of members 38.

At 29 I show rigid links perforated at either end for the reception of the shanks of pins or rivets 28 and 30 respectively, the pins or rivets 30 passing through the perforations in the lower ends of the links 29 also passing through perforations 31 in a U-shaped brake shoe supporting lever 32, the brake shoe 43 being carried on the extreme forward portion of the lever 32 as shown in Figs. 1, 2 and 3, and the pins or rivets 27 being carried on the rearmost ends of the parallel arms 36 of the lever 32 as seen in those figures. The linkage comprising the side arms of the lever member 19, the links 29 and the side arms of the lever 32 are thus secured together by pins or rivets 27, 28 and 30 in such a way as to form at each pin a hinge connection between the secured links and to form at the pins or rivets 27, moreover, a slidable connection within the slots 25. Loops 33 and 34 are provided in the intermediate arm 22 of the U-shaped lever member 19 and between each of the loops 33 and 34, and the rivet or pin 27 located on the same side of the wheel 11 in each case a helical spring 35 extends, the ends of each spring 35 being secured to an extension of its associated pin 27 in each case and to the loops 33 and 34 as the case may be, for each side of the vehicle, the springs being placed in tensile stress and creating a constant resilient effort to pull the pin 27 forwardly in the slot 25, that is, toward the arm 22 of the lever 19 so as to keep the end of the brake shoe supporting lever in extended position. This maintains the brake shoe 43 spaced from the tire 42 of the wheel and out of contact therewith.

When the combined brake and stand is in the normal position which it assumes when the vehicle is in operative condition, that is, in the position shown in Figs. 1, 2 and 3, the U-shaped lever member 32 rests, at its forwardly disposed intermediate portion, upon the side frame members 13 of the vehicle, the point of contact normally being that indicated at 45, and in such position the brake shoe 43 is maintained out of contact with the wheel tire 42.

When, however, it is desired to apply the brake, this is accomplished by the operator placing his foot, and usually the heel thereof, upon the upper surface of the pedal portion surface of the U-shaped lever 19 and depressing the same so that it takes the position indicated by dotted lines at 46. Now, by virtue of the link connection 29 and the slot 25, a connection therewith through pin 27, this motion is converted to a rearward motion of the brake shoe member 43 carried on the forwardly disposed intermediate portion of the U-shaped lever 32, the rearwardly disposed ends of the side arms of the lever 32 which carry the pins 27 will be thrust rearwardly with the pins 27 guided by the slots 25 toward the rearmost ends of the slots 25. This movement will continue until the rearward motion of the brake shoe 43 is arrested by coming into contact at 47 with the tire 42, the contact made being a breaking contact and the degree of braking depending upon the pressure imparted to the U-shaped member 19 by the foot of the operator, and the amount of clutching effort exerted between the lever 19 and the wheel tire.

Upon the release of this pressure, the springs 35 will restore the parts to non-braking position such as shown by the solid lines of Fig. 3, the dotted lines in Fig. 3 showing the positions taken by the various parts at the time of braking.

It is found that this mechanism as described produces a very efficient braking action; it will not become jammed in either operative or inoperative position and has the advantage of accomplishing a considerable movement of the brake shoe for a given amount of braking pressure applied to the shoe and with a very moderate downward movement of the braking pedal, which, in this case is the lever member 19.

While I have described a specific embodiment of my invention to convey a clear understanding of the invention, I am aware that numerous and extensive departures may be made from the embodiment herein illustrated and described, but without departing from the spirit of my invention.

I claim:—

1. In a two wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said brake shoe and lever being connected by a linkage comprising a second lever which carries the brake shoe at one end and is slidable on said first lever at its other end, and a link interconnecting an intermediate portion of said second lever and said first lever.

2. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said brake shoe and lever being connected by a linkage comprising a second lever which carries the brake shoe at one end and is slidable on said first lever at its other end, and a link interconnecting an intermediate portion of said second lever and said first lever, said first and second levers being substantially U-shaped with the arms thereof disposed on the two sides of the wheel and with their intermediate portions disposed transversely to and outside the wheel tire.

3. In a two-wheeled vehicle of the "scooter" type, the combination with the two wheels of the vehichle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said brake shoe and lever being connected by a linkage comprising a second lever which carries the brake shoe at one end and is slidable on said first lever at its other end, and a link interconnecting an intermediate portion of said second lever and said first lever, the second lever resting against the upper adjacent surface of the vehicle frame, and being guided thereby when the first lever is depressed to cause its brake shoe carrying end to move substantially horizontally and rearwardly.

4. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said brake shoe and lever being connected by a linkage comprising a second lever which carried the brake shoe at one end and is slidable on said first lever at its other end and a link interconnecting an intermediate portion of said second lever and said first lever, said first and second levers being substantially U-shaped with the arms thereof disposed on the two sides of the wheel and with their intermediate portions disposed transversely to and outside the wheel tire, the second lever resting against the upper adjacent surface of the vehicle frame, and being guided thereby when the first lever is depressed to cause its brake shoe carrying end to move substantially horizontally and rearwardly.

5. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said brake shoe and lever being connected by a linkage comprising a second lever which carries the brake shoe at one end and is slidable on said first lever at its other end, and a link interconnecting an intermediate portion of said second lever and said first lever, said first lever having an elongated slot near its fulcrum end, the end of the second lever being reciprocable within said slot whenever the first lever is depressed to operate the brake.

6. In a vehicle, the combination with a pair of longitudinally disposed wheels, a frame joining the wheels, a brake for one of the wheels, a brake lever adapted to be swung from a non-braking to a brake operating position, a pivoted stand adapted to be swung from a vehicle supporting position to a position wherein it may serve as a brake pedal to move said lever to apply the brake.

7. In a vehicle the combination with a pair of longitudinally disposed wheels, a frame joining the wheels, a brake lever adapted to be swung from a non-braking to a brake operating position, a pivoted stand adapted to be swung from a vehicle supporting position to a position wherein it is supported by said brake lever, said stand comprising a brake pedal portion adapted to be engaged by the foot of a rider to cause the stand to move the brake lever to brake operating position.

8. In a vehicle the combination with a pair of longitudinally disposed wheels, a frame joining the wheels, a brake lever adapted to be swung from a non-braking to a brake operating position, a pivoted stand adapted to be swung from a vehicle supporting position to a position wherein it is supported by said brake lever, said stand comprising a brake pedal portion adapted to be engaged by the foot of a rider to cause the stand to move the brake lever to brake operating position, and spring means to resist movement of said brake lever to brake operating position.

9. A two wheeled vehicle comprising a frame adapted to support a rider at an intermediate point, wheels at opposite ends of the frame, front and rear, and a brake mechanism for the rear wheel comprising a pair of pivoted levers, a brake shoe, one of said levers comprising a pedal portion engageable by the heel of a rider, the other lever adapted to communicate motion from the first lever to the brake shoe to apply the brake.

10. A two wheeled vehicle comprising a frame adapted to support a rider at an intermediate point, wheels at opposite ends of the frame, front and rear, and a brake mechanism for the rear wheel comprising a pair of pivoted levers, a brake shoe, one of said levers comprising a pedal portion engageable by the heel of a rider, the other lever adapted to communicate motion from the first lever to the brake shoe to apply the brake, and a spring for normally holding the brake shoe out of contact with the wheel.

11. In a vehicle of the class described, a frame, front and rear supporting wheels for the frame, a platform mounted on the frame between the wheels, a brake lever pivoted to the frame at the rear of the platform and operable to have braking engagement with the rear wheel, and a U-shaped support for the vehicle pivotally connected to the rear end of the frame and adapted when not in use as a support to be swung upward and forward over the rear wheel with its cross bar in operating engagement with the brake lever.

In testimony whereof I hereunto affix my signature this 11th day of December, 1924.

MAYO E. ROE.